United States Patent Office 3,282,859
Patented Nov. 1, 1966

3,282,859
PROCESS FOR PREPARING CATALYSTS FOR USE IN THE PRODUCTION OF NITRILES
Richard W. Baker and William A. Stover, Ellicott City, and Preston L. Veltman, Severna Park, Md., assignors to W. R. Grace & Co., New York, N.Y., a corporation of Connecticut
No Drawing. Filed Mar. 22, 1962, Ser. No. 181,797
2 Claims. (Cl. 252—432)

This invention relates to a process for the preparation of dinitriles by the reaction of substituted and unsubstituted adipic acids, with ammonia with the presence of a catalyst, and is more particularly directed to an improved catalyst for use in this reaction.

Various catalysts have been heretofore employed for promoting the reaction between adipic acid and ammonia according to the illustrative equation:

$$[R(COOH)_2] + 2NH_3 = R(CN)_2 + 4H_2O$$
$$I$$

where I is substituted or unsubstituted adipic acid. This reaction has been effected by passing a substituted or unsubstituted adipic acid along with dry ammonia gas over various catalysts at a temperature of about 300° C.

The use of boron phosphate as a catalyst for the reaction of adipic acid with ammonia to form nitriles is broadly old. This catalyst is mentioned in the work by Noller entitled Chemistry of Organic Compounds (W. T. Saunders), 1951. The use of this catalyst has posed several problems. The catalyst tends to decompose with increased running time and tends to become deactivated by mechanical coating of the catalyst.

An object of this invention is to prepare adiponitrile. A further object is to provide a catalytic process for the preparation of adiponitrile from substituted and unsubstituted adipic acid and ammonia. A still further object is to provide an efficient catalytic process for the conversion of adipic acid to adiponitrile that does not result in the disintegration of catalyst particles and the accumulation of large amount of tar like residue on the catalyst mass. If the catalyst is prepared in our novel manner, these problems are solved or greatly alleviated.

Our novel catalyst consists of boron phosphate impregnated on nodules of gamma type alumina or on the gamma type alumina material itself. This catalyst is prepared by the technique of dissolving boric acid in water and impregnating the alumina with this solution. The impregnated alumina is dried and reimpregnated with 86% phosphoric acid. This final catalyst is then dried and calcined for an appropriate period of time. This catalyst has been found to be a very hard catalyst that gives high yields of desired product and avoids the above-mentioned problems. The catalyst of the present invention can be employed with either unsubstituted adipic acid or substituted adipic acid. Good results have been obtained, for example, in the reactions of trimethyladipic acid and ammonia.

The catalyst may be prepared according to the novel process described above and may be prepared on either granulated gamma type alumina or the nodules of gamma type alumina depending on the type of equipment to be used in the nitrile preparation.

In carrying out the process using the catalyst of the present invention, the adipic acid and ammonia reactants are passed through the catalyst reaction chamber at a temperature of about 300–450° C., preferably between 340 and 400° C. Atmospheric, sub-atmospheric or super-atmospheric pressures may be employed, though it has been observed that somewhat lower yields of nitriles are obtained in some instances when the reaction pressure is above atmospheric. The reactants are passed through the catalyst chamber. The product is normally gaseous in character and is condensed and the nitrile product separated from the resulting condensate by fractional distillation or other suitable methods.

The reactants are preferably preheated to reaction temperature before being introduced into the reaction zone. Care should be taken that the preheated reactants are not premixed for any appreciable length of time before being passed over the catalyst, since secondary reactions may then occur. Preferably the reactants are separately preheated and are only brought together in the reaction zone. While in batch preparation techniques maximum temperatures of 300° C. occur which correspond closely to the boiling point of the nitrile product under normal pressure, the optimum temperature of 370° C. is preferred in the gas phase process. For best results an excess of ammonia over stoichiometric proportions required for the reaction should be used. In the continuous process, two to three cubic meters of ammonia are used per kilogram of adipic acid. This excess serves, among other purposes, to stabilize temperature and to increase the yield.

The invention is further illustrated by the following specific but non-limiting examples.

*Example I*

The catalyst was prepared using nodules of gamma type alumina as the base.

In this preparation a total of 271 grams of boric acid was dissolved in deionized water by heating to 140° F. The total solution volume was 250 ml. The solution was used to impregnate 4100 grams of nodules of gamma type alumina. These nodules, after impregnation, were dried for 2 hours at 230° F. in a forced draft oven. The material was removed and cooled to room temperature. A change of 497.4 grams of 86% phosphoric acid was diluted to a total of 1804 ml. with deionized water. This solution was used to reimpregnate the gamma type alumina nodules. After reimpregnation was complete, the material was dried for several additional hours at 230° F. and then calcined for 3 hours at 1000° F. After this treatment, the catalyst was ready for use in the catalytic process.

*Example II*

This example illustrates the method of preparing the adiponitrile product.

A stream of ammonia is passed over a bed of boron phosphate catalyst on a gamma alumina support. The ammonia is preheated to a temperature of about 325–340° C. The boron phosphate catalyst is also maintained at this temperature. A total of 1 kilogram of adipic acid is vaporized and heated to the temperature of reaction (about 325° C.). The two streams are then passed through the catalyst bed. The space velocity of the reactants is controlled so that the contact time is about five seconds. In traversing the catalyst bed the vapor mixture is dehydrated to adiponitrile and water. The product is condensed and separated into two layers approximately equal in volume. The upper layer contains the nitrile which is separated by distillation.

Obviously many modifications and variations of the invention, as hereinabove set forth, may be made without departing from the essence and scope thereof, and only such limitations should be applied, as indicated in the appended claims.

What is claimed is:
1. A process for preparing a catalyst suitable for the conversion of adipic acid to adiponitrile which comprises impregnating a gamma type alumina with a quantity of boric acid equal to 6% of the weight of the base, drying the impregnated base, reimpregnating said base with a quantity of phosphoric acid equal to about 10% of the weight of the catalyst base, drying, calcining and recovering the catalyst product.

2. The process according to claim 1 wherein the boric acid impregnated base is dried at a temperature of about 230° F., reimpregnated with phosphoric acid, dried at a temperature of about 230° F. and calcined at a temperature of about 1000° F. for about 3 hours.

References Cited by the Examiner

UNITED STATES PATENTS

| | | | |
|---|---|---|---|
| 2,144,340 | 1/1939 | Lazier | 260—465.2 |
| 2,441,493 | 5/1948 | Krug | 252—432 X |
| 2,446,619 | 8/1948 | Stewart et al. | 252—432 X |
| 2,493,637 | 1/1950 | Niederhauser | 260—465.2 |
| 2,525,145 | 10/1950 | Mavity | 252—432 |
| 2,596,497 | 5/1952 | Mavity | 252—432 |
| 2,606,877 | 8/1952 | West | 252—432 |
| 2,808,426 | 10/1957 | Potts et al. | 260—465.2 |
| 3,142,712 | 7/1964 | Valet et al. | 252—432 X |
| 3,153,084 | 10/1964 | Veazey et al. | 260—465.2 |

FOREIGN PATENTS 650,149    10/1964    Canada.

OSCAR R. VERTIZ, *Primary Examiner.*

CHARLES B. PARKER, MAURICE A. BRINDISI,
*Examiners.*

J. P. BRUST, H. S. MILLER, R. M. DAVIDSON,
*Assistant Examiners.*